United States Patent
Wang (10) Patent No.: US 10,539,470 B2
(45) Date of Patent: Jan. 21, 2020

(54) SUB-THRESHOLD-BASED SEMICONDUCTOR TEMPERATURE SENSOR

(71) Applicant: QUALCOMM Incorporated, San Diego, CA (US)

(72) Inventor: Kevin Jia-Nong Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 15/788,713

(22) Filed: Oct. 19, 2017

(65) Prior Publication Data
US 2019/0120699 A1    Apr. 25, 2019

(51) Int. Cl.
*G01K 7/01* (2006.01)

(52) U.S. Cl.
CPC .................. *G01K 7/015* (2013.01)

(58) Field of Classification Search
CPC .................................................. G01K 7/015
See application file for complete search history.

(56) References Cited

U.S. PATENT DOCUMENTS

| | | |
|---|---|---|
| 5,873,053 A | 2/1999 | Pricer et al. |
| 6,084,462 A | 7/2000 | Barker |
| 7,225,099 B1 * | 5/2007 | O'Dwyer ............... G01K 7/01 374/E7.035 |
| 7,741,925 B2 * | 6/2010 | Yoshikawa ............. G01K 7/01 327/512 |
| 8,177,426 B2 | 5/2012 | Guo et al. |
| 8,931,953 B2 | 1/2015 | Law et al. |
| 2012/0201273 A1 | 8/2012 | Mukherjee et al. |
| 2015/0355033 A1 | 12/2015 | Zhang et al. |

FOREIGN PATENT DOCUMENTS

JP    2007024667 A  *  2/2007  ............... G01K 7/01

OTHER PUBLICATIONS

International Search Report and Written Opinion—PCT/US2018/051915—ISA/EPO—dated Jan. 21, 2019.
Jeong S., et al., "65nW CMOS Temperature Sensor for Ultra-Low Power Microsystems", Proceedings of the IEEE 2013 Custom Integrated Circuits Conference, IEEE, Sep. 22, 2013, XP032524664, DOI:10.1109/CICC.2013.6658447 [retrieved on Nov. 7, 2013], pp. 1-4.
Lu L., et al., "A Subthreshold-MOSFETs-Based Scattered Relative Temperature Sensor Front-End With a Non-Calibrated ±2.5?C 3 σ Relative Inaccuracy From −40?Cto 100?C", IEEE Transactions on Circuits and Systems I: Regular papers, IEEE, US, vol. 60, No. 5, May 1, 2013, XP011505597, ISSN: 1549-8328, DOI: 10.1109/TCSI.2013.2249131, pp. 1104-1112.
Liu Y., et al., "An Ultra-Low Power CMOS Subthreshold Voltage Reference without Requiring Resistors or BJTs", 2016 IEEE Asia Pacific Conference on Circuits and Systems (APCCAS), 2016, pp. 688-690.

* cited by examiner

*Primary Examiner* — Clayton E. LaBalle
*Assistant Examiner* — Leon W Rhodes, Jr.
(74) *Attorney, Agent, or Firm* — Haynes and Boone, LLP (36340)

(57) ABSTRACT

A sub-threshold MOSFET temperature sensor is provided in which a sub-threshold leakage current through a sub-threshold transistor having its source connected to its gate is mirrored through a diode-connected transistor to produce an output voltage. Feedback maintains a drain voltage for the sub-threshold transistor to equal the output voltage.

11 Claims, 8 Drawing Sheets

SUB-THRESHOLD-BASED SEMICONDUCTOR TEMPERATURE SENSOR

TECHNICAL FIELD

This application relates to sub-threshold-based metal-oxide semiconductor temperature sensors.

BACKGROUND

Temperature sensors have multiple applications in a system-on-a-chip (SoC) integrated circuit. For example, a processor temperature sensor monitors the central processing unit (CPU) temperature so that the CPU operation may be throttled to avoid exceeding the thermal threshold for the CPU. Similarly, dynamic voltage scaling for the CPU power supply voltage and clocking frequency may be controlled responsive to a processor temperature sensor. In addition, a temperature sensor may be integrated with precision analog circuitry within an integrated circuit so that temperature effects may be compensated.

Figure 1:
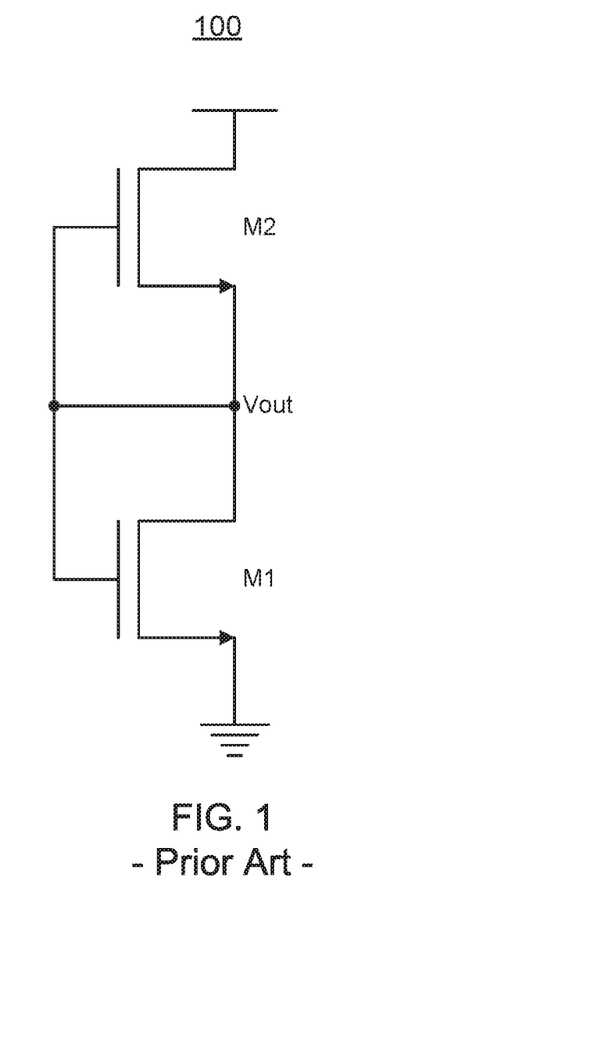
FIG. 1 is a circuit diagram of a conventional sub-threshold MOSFET temperature sensor.

However, prior art temperature sensors have a number of issues with regard to their implementation. For example, bipolar junction transistors have commonly been used to form a temperature sensor. But bipolar transistors in modern complementary metal-oxide semiconductor (CMOS) processing nodes are parasitic devices that are relatively large and have increased variability as compared to metal-oxide semiconductor field-effect transistor (MOSFET) devices. Sub-threshold MOSFET temperature sensors have thus been developed to avoid the use of bipolar junction transistors. A conventional sub-threshold MOSFET temperature sensor 100 is shown in FIG. 1. An n-type metal-oxide semiconductor (NMOS) sub-threshold transistor M2 has its source connected to an output node for the output voltage Vout. The gate of sub-threshold transistor M2 is also connected to the output node so that sub-threshold transistor M2 has a gate-to-source voltage of zero volts. Sub-threshold transistor M2 will thus conduct only a sub-threshold leakage current. The drain of sub-threshold transistor M2 connects to a power supply voltage node. An NMOS diode-connected transistor M1 has its gate and drain connected to the output node and its source connected to ground. Diode-connected transistor M1 will thus conduct the sub-threshold leakage current conducted by sub-threshold transistor M2. The diode connection for diode-connected transistor M1 develops the output voltage on the output node in response to the sub-threshold leakage current from sub-threshold transistor M2. Sub-threshold transistor M2 would typically be many times larger than diode-connected transistor M1 so that a sufficient amount of sub-threshold leakage current is passed to produce the output voltage at the drain of diode-connected transistor M1.

Although sub-threshold MOSFET temperature sensor 100 avoids the problems resulting from bipolar junction transistor variability and die area demands, its operation still suffers from a number of problems. For example, the bulk-to-source voltages for diode-connected transistor M1 and sub-threshold transistor M2 are not matched, which leads to variability for the resulting temperature sensor performance. In addition, the drain-to-source voltage (Vds) for sub-threshold transistor M2 is relatively large. Such a large Vds provokes additional leakage mechanisms such as gate-induced drain leakage (GIDL) effects that spoil the desired proportional-to-absolute temperature (PTAT) behavior of the sub-threshold MOS temperature sensor 100. Accordingly, there is a need in the art for improved sub-threshold MOSFET temperature sensors.

SUMMARY

A sub-threshold MOSFET temperature sensor is provided that includes a diode-connected transistor having a drain and a gate connected to an output node and that also includes a sub-threshold transistor having a source and a gate connected together so that the sub-threshold transistor is configured to conduct a sub-threshold leakage current resulting from its zero gate-to-source voltage. The sub-threshold MOSFET temperature sensor further includes a current mirror and feedback circuit configured to mirror the sub-threshold leakage through the diode-connected transistor to produce an output voltage at the output node, wherein the current mirror and feedback circuit is further configured to maintain a drain voltage for the sub-threshold transistor to equal the output voltage.

Since the drain voltage for the sub-threshold transistor equals the output voltage, gate-induced leakage current effects for the sub-threshold transistor are reduced since the output voltage is lower than a power supply voltage for the sub-threshold MOSFET temperature sensor. Moreover, the source, bulk, and drain voltages for the sub-threshold transistor are matched to the corresponding source, bulk, and drain voltage for the diode-connected transistor.

These and other advantageous features may be better appreciated through the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To provide improved accuracy and reduced variability, a sub-threshold MOSFET temperature sensor is provided that includes a sub-threshold transistor having its gate and source connected together so as to conduct a sub-threshold leakage current. The temperature sensor also includes a diode-connected transistor having its drain and gate connected to an output node for the temperature sensor. The sub-threshold MOSFET temperature sensor further includes a current mirror and feedback circuit that is configured to mirror the sub-threshold leakage current through the diode-connected transistor to produce an output voltage at the output node. The current mirror and feedback circuit is also configured to maintain the drain voltage for the sub-threshold transistor to equal the output voltage.

The resulting sub-threshold MOSFET temperature sensor may be either a sub-threshold NMOS temperature sensor in which the sub-threshold transistor is an NMOS transistor or may be a sub-threshold PMOS temperature sensor in which the sub-threshold transistor is a PMOS transistor. Regardless of the sub-threshold transistor configuration, the resulting sub-threshold MOSFET temperature sensor is quite advantageous because the problems of gate-induced leakage current for the sub-threshold transistor are reduced since its drain-to-source voltage equals the voltage drop across a diode-connected transistor conducting a mirrored version of the sub-threshold leakage current conducted by the sub-threshold transistor. This voltage drop is typically rather low (for example, 100 mV) as compared to a power supply voltage such as a 1V power supply voltage. In addition, the bulk, source, and drain voltages for the sub-threshold transistor and for the diode-connected transistor are now matched. These advantageous features may be better appreciated through a consideration of the following example embodiments.

Figure 2A:
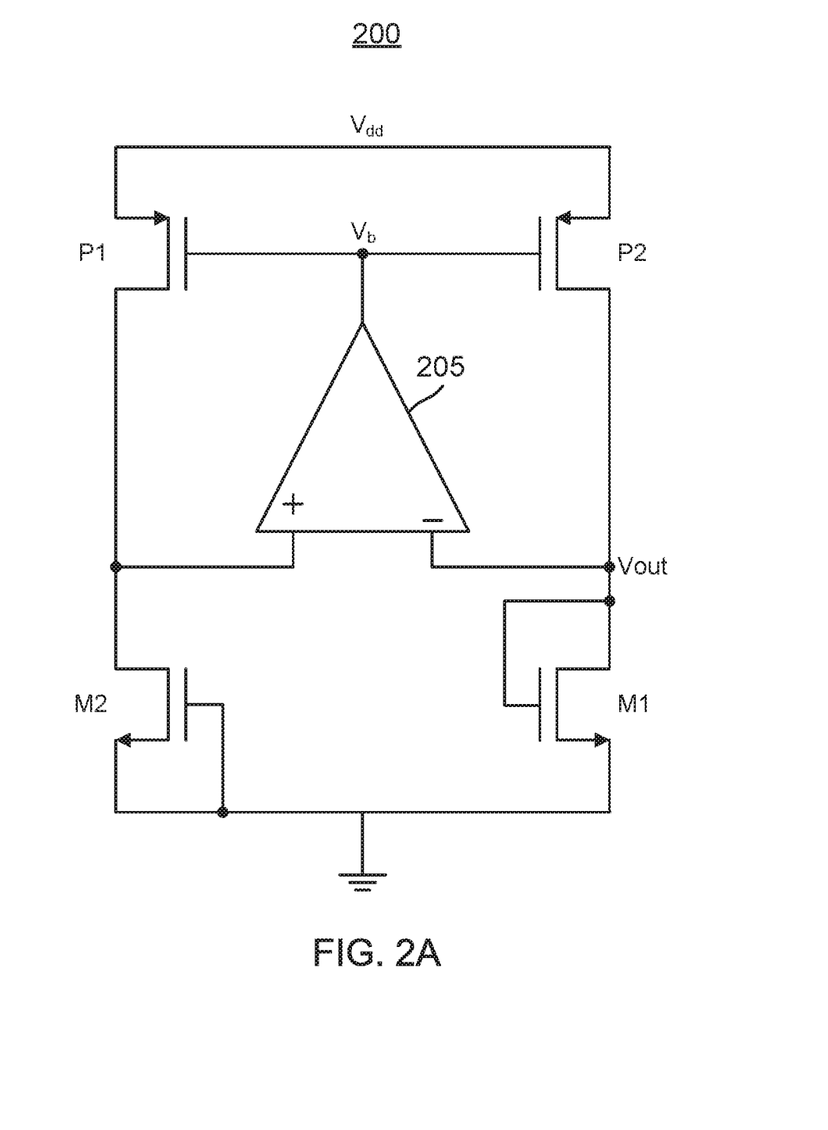
FIG. 2A is a circuit diagram of an improved sub-threshold NMOS temperature sensor including a differential amplifier in accordance with an aspect of the disclosure.

A first example sub-threshold NMOS temperature sensor 200 is shown in FIG. 2A. An NMOS sub-threshold transistor M2 and an NMOS diode-connected transistor M1 are analogous to the corresponding transistors M1 and M2 discussed with regard to FIG. 1. For example, the gate and source of sub-threshold transistor M2 are connected so that sub-threshold transistor M2 conducts only a sub-threshold leakage current due to its zero gate-to-source voltage. Similarly, the source of diode-connected transistor M1 connects to ground. In contrast to sub-threshold transistor M2 of FIG. 1, the gate and source of sub-threshold transistor M2 both connect to ground in sub-threshold MOSFET temperature sensor 200. The gate and drain of diode-connected transistor M1 functions as an output node carrying an output voltage (Vout). A current mirror and feedback circuit for sub-threshold MOSFET temperature sensor 200 is formed by a p-type metal-oxide semiconductor (PMOS) transistor P1, a PMOS transistor P2, and an operational amplifier 205. The drain of sub-threshold transistor M2 connects to a drain of transistor P1, which has its source connected to a power supply node carrying a power supply voltage Vdd. Similarly, the drain of diode-connected transistor M1 connects to a drain of transistor P2, which has its source tied to the power supply node. Operational amplifier 205 has its inputs connected to the drains of sub-threshold transistor M2 and diode-connected transistor M1 and drives the gates of transistors P1 and P2 with a drive voltage Vb responsive to the difference between the drain voltages for sub-threshold transistor M2 and diode-connected transistor M1. Feedback through operational amplifier 205 thus maintains the drain voltage of sub-threshold transistor M2 to equal the output voltage Vout. The polarity of the inputs for operational amplifier 205 are arbitrary—in FIG. 2A, it is the positive input terminal for operational amplifier 205 that connects to the drain of sub-threshold transistor M2 but this may be reversed such that the negative input terminal for operational amplifier 205 would be connected to the drain of sub-threshold transistor M2 in alternative embodiments. Similarly, the negative input terminal for operational amplifier 205 connects to the drain of diode-connected transistor M1 in FIG. 2A but this may be reversed such that the positive input terminal for operational amplifier would be connected to the drain of diode-connected transistor M1 in alternative embodiments.

Transistor P1 conducts the sub-threshold leakage current conducted by sub-threshold transistor M2 since these transistors are connected in series. The source voltages for transistors P1 and P2 are the same since their sources are both tied to the power supply node. The gate voltages for transistors P1 and P2 are also the same since their gates are tied together. Finally, operational amplifier 205 functions to maintain the drain voltages for transistors P1 and P2 to be equal. Since the source, drain, and gate voltages for transistor P1 thus equal the corresponding source, drain, and gate voltages for transistor P2, transistor P2 will also conduct the sub-threshold current. The sub-threshold current is thus mirrored into diode-connected transistor M1. The bulk voltage for sub-threshold transistor M2 and diode-connected transistor M1 are both zero. Similarly, the source voltages for sub-threshold transistor M2 and diode-connected transistor M1 are grounded. Finally, the drain voltage for sub-threshold transistor M2 and diode-connected transistor M1 both equal the output voltage Vout due to the feedback through operational amplifier 205. The bulk, source, and drain voltages for sub-threshold transistor M2 and for diode-connected transistor M1 are thus matched. To provide a sufficient amount of sub-threshold leakage current, sub-threshold transistor M2 may be many times larger than diode-connected transistor M1. For example, sub-threshold transistor M2 may be 128 times larger than diode-connected transistor M1 in some embodiments.

Although the bulk, source, and drain voltages for sub-threshold transistor M2 and diode-connected transistor M1 are matched, the mirroring of the sub-threshold leakage current from sub-threshold transistor M2 into diode-connected transistor M1 depends upon the matching between transistors P1 and P2. In reality, there will typically be some slight mismatch between transistors P1 and P2 due to manufacturing tolerances. But such mismatching is readily accounted for using known current mirror techniques to address mismatch such as chopping in which the roles of transistors P1 and P2 are reversed through switches (not illustrated). In one switch configuration, transistors P1 and P2 are arranged as shown in FIG. 2A. But in another switch configuration, transistor P2 would have its drain connected to the drain of sub-threshold transistor M2 instead of the drain of diode-connected transistor M1. In this same switch configuration, transistor P1 would have its drain connected to the drain of diode-connected transistor M1 instead of the drain of sub-threshold transistor M2. By alternately switching between these two switch configurations, any mismatching in the mirroring of the sub-threshold leakage current are averaged out. But it will be appreciated that satisfactory performance is achieved in alternative embodiments without the inclusion of such mismatch-addressing techniques such as shown in FIG. 2A.

Figure 2B:
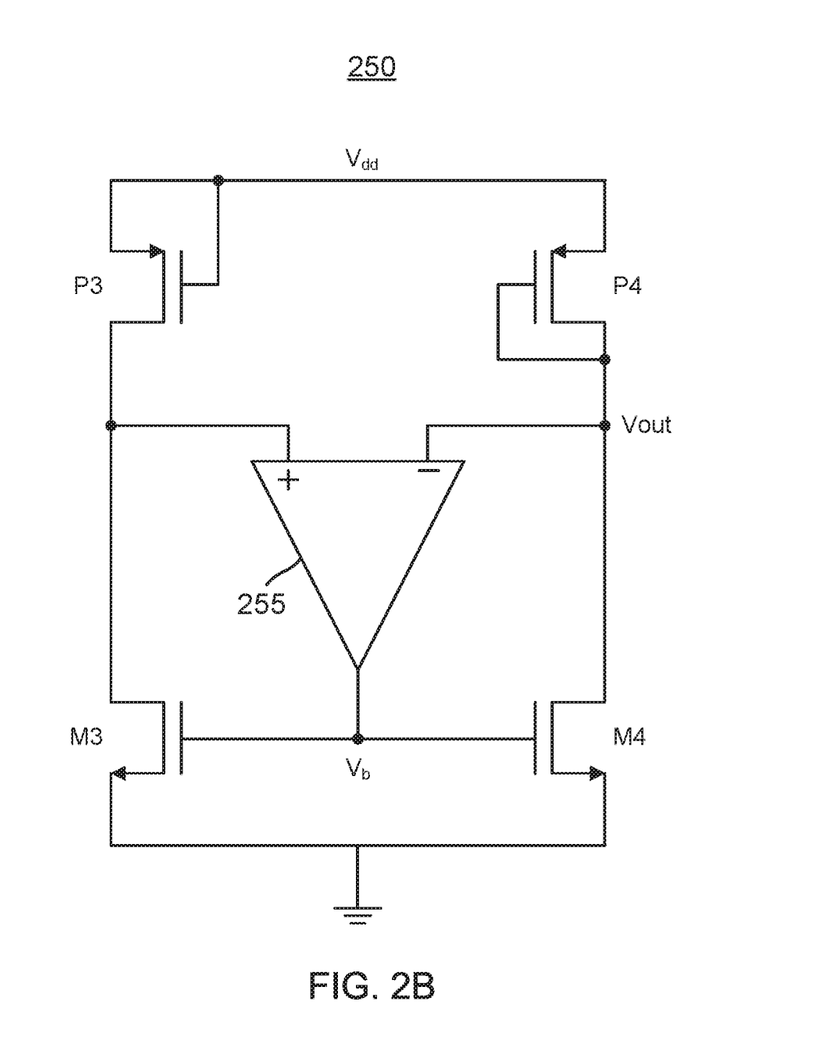
FIG. 2B is a circuit diagram of an improved sub-threshold PMOS temperature sensor including a differential amplifier in accordance with an aspect of the disclosure.

One of ordinary skill in the art will readily appreciate that the NMOS temperature sensor 200 may be altered to form a PMOS temperature sensor 250 as shown in FIG. 2B. A sub-threshold PMOS transistor P3 has its source and gate connected to the power supply node and will thus conduct a sub-threshold leakage current that will be mirrored through a diode-connected PMOS transistor P4 having its source tied to the power supply node. An operational amplifier 255 drives the gates of a pair of NMOS transistors M3 and M4 to mirror the sub-threshold leakage current through diode-connected transistor P4 responsive to a difference between the drain voltages for sub-threshold transistor P3 and diode-connected transistor P4. The sources for transistors M3 and M4 are tied to ground whereas the drain of transistor M3 is connected to the drain of sub-threshold transistor P3. Similarly, the drain of transistor M4 is connected to the drain of diode-connected transistor P4.

Figure 3A:
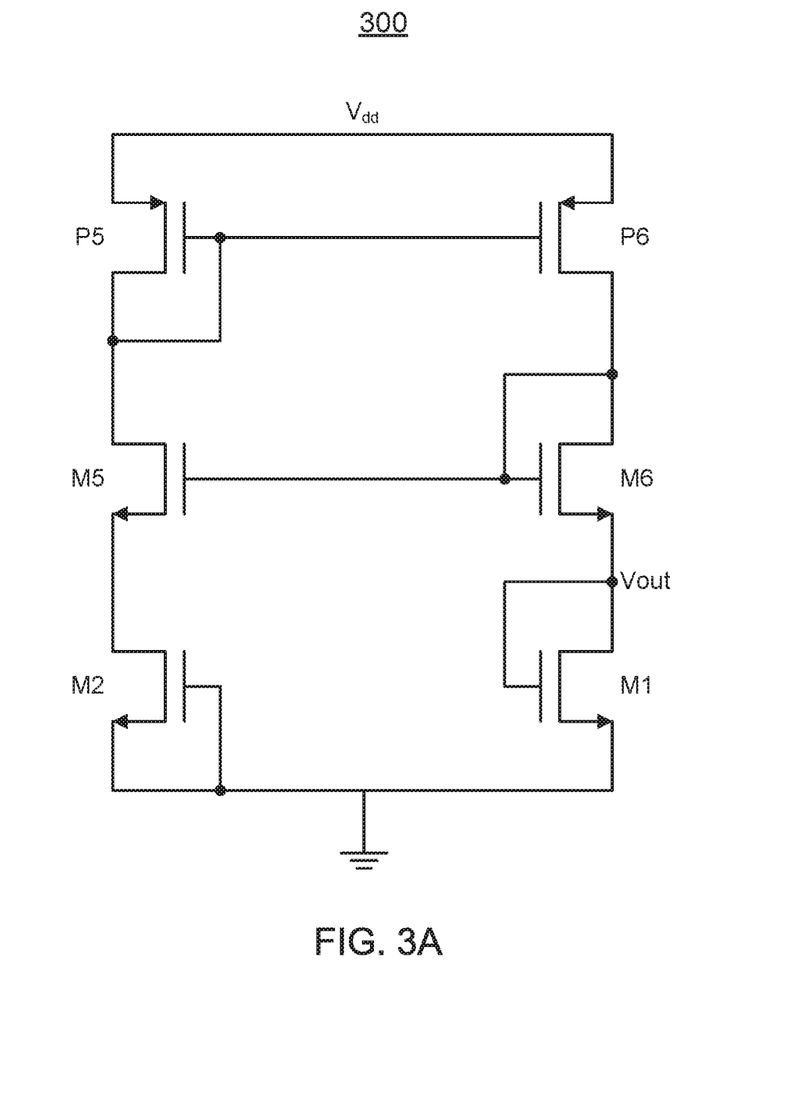
FIG. 3A is a circuit diagram of an improved sub-threshold NMOS temperature sensor that does not include a differential amplifier in accordance with an aspect of the disclosure.

Although operational amplifiers 205 and 255 ensure an accurate mirroring of the sub-threshold leakage current, their implementation demands a certain amount of die space. A more compact sub-threshold NMOS temperature sensor 300 is shown in FIG. 3A. Diode-connected transistor M1 and sub-threshold transistor M2 are arranged as discussed with regard to FIG. 2A. But the current mirror and feedback circuit is implemented through a PMOS diode-connected transistor P5, a PMOS transistor P6, an NMOS transistor M5, and a diode-connected transistor M6. The sub-threshold leakage current conducted by sub-threshold transistor M2 is conducted through diode-connected transistor P5, which has its source connected to the power supply node for power supply voltage Vdd. Diode-connected transistor P5 has its gate connected to the gate of transistor P6, which also has its source connected to the power supply node. Diode-connected transistor P5 and transistor P6 thus form a current mirror to mirror the sub-threshold leakage current conducted by sub-threshold transistor M2 through transistor P6. The drain of transistor P6 connects to the drain and gate of diode-connected transistor M6, which has its source connected to the drain of diode-connected transistor M1 (and also to the output node for output voltage Vout). Diode-connected transistor M6 thus conducts the mirrored sub-threshold leakage current through diode-connected transistor M1 to develop the output voltage Vout accordingly. The gate of diode-connected transistor M6 connects to the gate of transistor M5, which has its source tied to the drain of sub-threshold transistor M2 and its drain connected to the drain of diode-connected transistor P5. The source voltage for transistor M5 will thus equal the source voltage for diode-connected transistor M6 such that the drain voltage for sub-threshold transistor M2 is maintained equal to the output voltage Vout. It will be appreciated that sub-threshold MOSFET temperature sensor 300 may be modified to address any mismatches in the current mirror transistors P5 and P6 such as through chopping as discussed with regard to FIG. 2A.

Figure 3B:
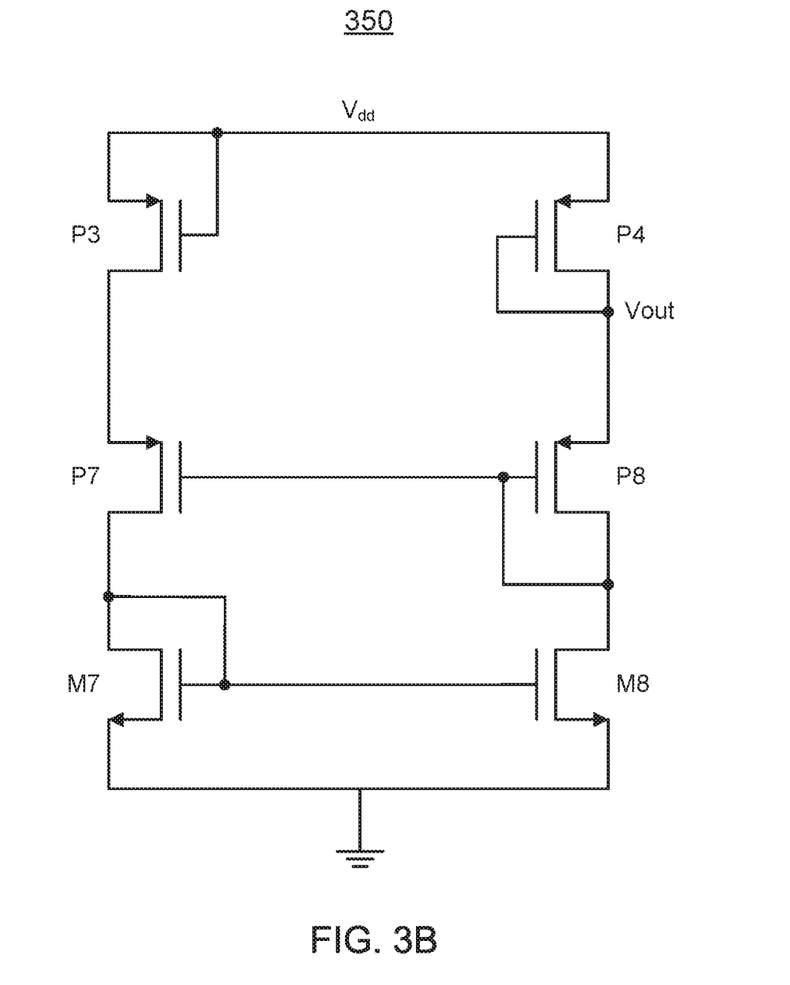
FIG. 3B is a circuit diagram of an improved sub-threshold PMOS temperature sensor that does not include a differential amplifier in accordance with an aspect of the disclosure.

A PMOS version 350 of temperature sensor 300 is shown in FIG. 3B. Diode-connected transistor P4 and sub-threshold transistor P3 are arranged as discussed with regard to FIG. 2B. But the current mirror and feedback circuit is implemented through an NMOS diode-connected transistor M7, an NMOS transistor M8, a PMOS transistor P7, and a PMOS diode-connected transistor P8. The sub-threshold leakage current conducted by sub-threshold transistor P3 is conducted through diode-connected transistor M7, which has its source connected to ground. Diode-connected transistor M7 has its gate connected to the gate of transistor M8, which also has its source connected to ground. Diode-connected transistor M7 and transistor M8 thus form a current mirror to mirror the sub-threshold leakage current conducted by sub-threshold transistor P3 through transistor M8. The drain of transistor M8 connects to the drain and gate of diode-connected transistor P8, which has its source connected to the drain of diode-connected transistor P4 (and also to the output node for output voltage Vout). Diode-connected transistor P8 thus conducts the mirrored sub-threshold leakage current through diode-connected transistor P4 to develop the output voltage Vout accordingly. The gate of diode-connected transistor P8 connects to the gate of transistor P7, which has its source tied to the drain of sub-threshold transistor P3 and its drain connected to the drain of diode-connected transistor M7. The source voltage for transistor P7 will thus equal the source voltage for diode-connected transistor P8 such that the drain voltage for sub-threshold transistor P3 is maintained equal to the output voltage Vout. It will be appreciated that sub-threshold MOSFET temperature sensor 350 may be modified to address any mismatches in the current mirror transistors M7 and M8 such as through chopping as discussed with regard to FIG. 2A.

In one embodiment, the current mirror and feedback circuit of FIGS. 2A, 2B, 3A, and 3B may be deemed to form a means for mirroring the sub-threshold leakage current through the diode-connected transistor (M1 or P4) to produce an output voltage at the drain of this diode-connected transistor, wherein the means is further configured to maintain a voltage for a drain of the sub-threshold transistor (M2 or P3) to equal the output voltage.

Figure 4:
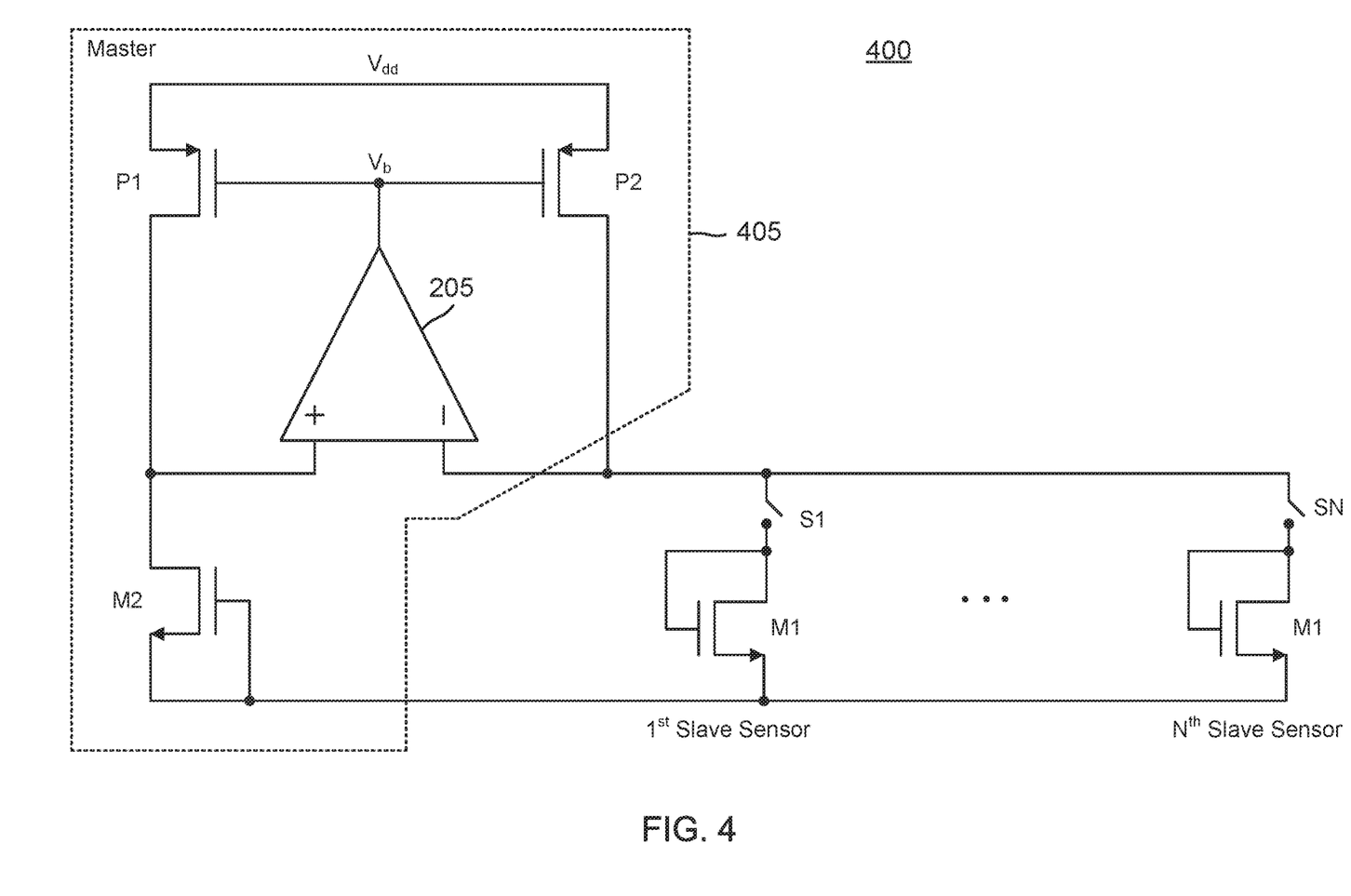
FIG. 4 is a circuit diagram of a master/slave temperature sensor system in accordance with an aspect of the disclosure.

Sub-threshold MOSFET temperature sensors 200, 250, 300 or 350 may be incorporated into a master/slave system of temperature sensors such as shown in FIG. 4 for a system 400. A plurality of slave sensors ranging from a first slave sensor to an Nth slave sensor are distributed across a die in locations where it is desired to measure the die temperature for the corresponding die location. Each slave sensor includes a duplicate of diode-connected transistor M1 and a corresponding switch. A master circuit 405 includes all the components for either of temperature sensors 200 or 300 except for diode-connected transistor M1. In FIG. 4, master circuit 405 includes the remainder of temperature sensor 200 but it will be appreciated that a master circuit may be formed, for example, using transistors M2, M5, M6, P5, and P6 of temperature sensor 300. Regardless of whether system 400 is based on temperatures sensor 200, 250, 300, or 350, the drain for each slave sensor's diode-connected transistor connects to the output node for master circuit 405 through a corresponding switch. For example, the drain of diode-connected transistor M1 in the first slave sensor connects through a first switch S 1 to the drain of transistor P2. Similarly, the drain of diode-connected transistor M1 in the Nth slave sensor connects through an Nth switch SN to the drain of transistor P2. The various switches for the slave sensors are controlled so that only one is closed during a temperature measurement for the slave sensor with the closed switch. The slave sensors may be distributed throughout an integrated circuit's die in the desired locations whereas master circuit 405 may be located within the SoC independently of the slave sensor locations. Each slave sensor would be selectively connected to the output node of master circuit 405 to determine a temperature of a die location including the slave sensor. In this fashion, master circuit 405 need not be duplicated yet a plurality of accurate temperature sensors may be distributed in desired locations across a die for an integrated circuit such as an SoC.

Figure 5:
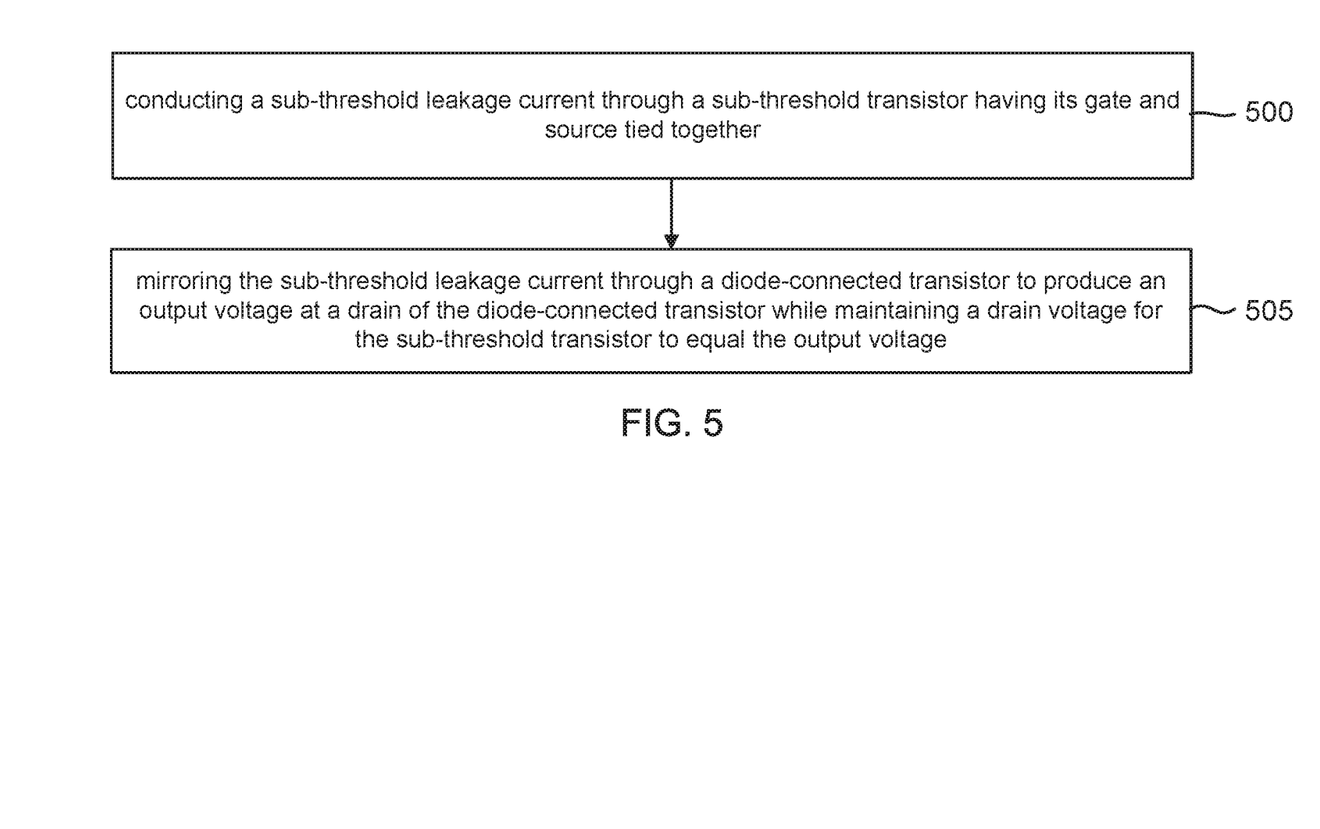
FIG. 5 is a flowchart for a method of operation for a sub-threshold MOSFET temperature sensor in accordance with an aspect of the disclosure.

A method of operation for a sub-threshold MOSFET temperature sensor will now be discussed with regard to the flowchart shown in FIG. 5. The method includes an act 500 of conducting a sub-threshold leakage current through a sub-threshold transistor having its gate and source tied together. The conduction of the sub-threshold leakage current in sub-threshold transistor M2 in FIGS. 2A and 2B as well as in sub-threshold transistor P3 in FIGS. 2B and 3B is an example of act 500. In addition, the method includes an act 505 of mirroring the sub-threshold leakage current through a diode-connected transistor to produce an output voltage at a drain of the diode-connected transistor while maintaining a drain voltage for the sub-threshold transistor to equal the output voltage. The action of the current mirror and feedback circuit in either FIG. 2A, 2B, 3A, or 3B is an example of act 505.

Figure 6:
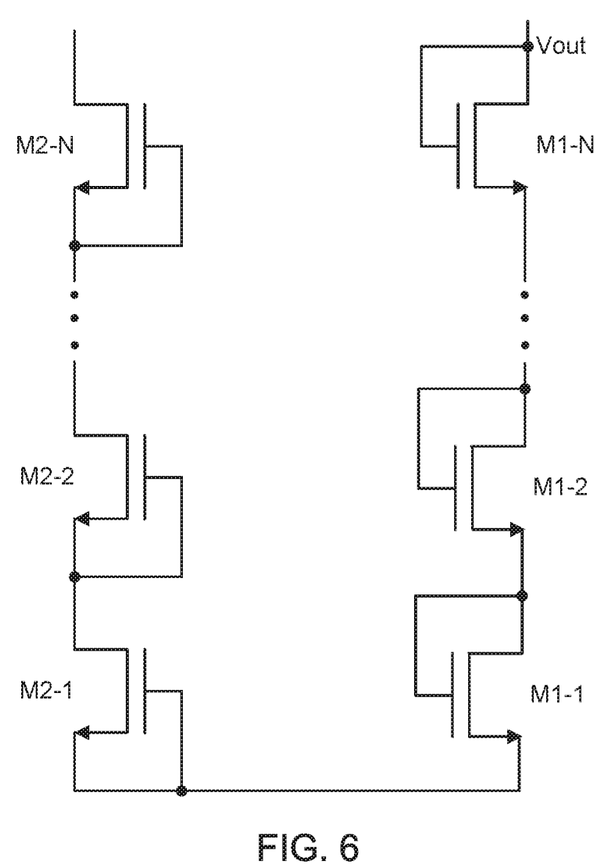
FIG. 6 illustrates the serial stacking of a plurality of diode-connected transistors and of a plurality of sub-threshold transistors to increase the output gain for the sub-threshold MOSFET temperatures sensor of FIGS. 2A and 2B.

It will be appreciated that many modifications, substitutions and variations can be made in and to the materials, apparatus, configurations and methods of use of the devices of the present disclosure without departing from the scope thereof. For example, diode-connected transistor M1 and sub-threshold transistor M2 may each be duplicated and arranged in series as shown in FIG. 6. In particular, diode-connected transistor M1 is duplicated to form a plurality of N diode-connected transistors arranged in series, starting from a first diode-connected transistor M1-1 to an Nth diode-connected transistor. Similarly, sub-threshold transistor M2 is duplicated to form a plurality of N sub-threshold transistors arranged in series, starting from a first sub-threshold transistor M2-1 to an Nth sub-threshold transistor M2-N. The resulting stacking of the duplicate transistors produces a larger voltage gain for the output voltage Vout with respect to temperature change. A similar stacking of duplicate transistors may be implemented for diode-connected transistor P4 and sub-threshold transistor P3. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A temperature sensor, comprising:
   a diode-connected transistor having a drain and a gate connected to an output node for the temperature sensor;
   a sensor transistor having a source and a gate connected together so that the transistor is configured to conduct a leakage current;
   a first transistor having a drain connected to the drain of the sensor transistor;
   a second transistor having a drain connected to a drain of the diode-connected transistor and having a source connected to a source of the first transistor; and
   an operational amplifier configured to drive a gate for the first transistor and a gate for the second transistor responsive to a comparison of the voltage of the drain of the sensor transistor to the output voltage.

2. The temperature sensor of claim 1, wherein the diode-connected transistor and the sensor transistor are both n-type metal-oxide semiconductor (NMOS) transistors, and wherein the first transistor is a first PMOS transistor having source connected to a power supply node, and wherein the second transistor is a second PMOS transistor having its source connected to the power supply node.

3. The temperature sensor of claim 1, wherein the diode-connected transistor and the sensor transistor are both p-type metal-oxide semiconductor (PMOS) transistors, and wherein the first transistor is a first NMOS transistor having source connected to ground, and wherein the second transistor is a second NMOS transistor having its source connected to ground.

4. The temperature sensor of claim 1, wherein the temperature sensor is integrated into a die for an integrated circuit, and wherein the sensor transistor and the current mirror and feedback circuit are included within a master circuit having a first location on the die, and wherein the diode-connected transistor is a first diode-connected transistor at a second location on the die, and wherein the first diode-connected transistor is coupled to an output node for the master circuit through a first switch, and wherein the leakage current is a sub-threshold leakage current.

5. The temperature sensor of claim 4, further comprising a plurality of diode-connected transistors distributed across the die, wherein each diode-connected transistor in the plurality of diode-connected transistors is configured to couple to the output node through a corresponding switch.

6. A method, comprising:
   conducting a sub-threshold current through a sensor transistor having its gate and source tied together;
   mirroring the leakage current through a diode-connected transistor to produce an output voltage at a drain of the diode-connected transistor while maintaining a drain voltage for the sensor transistor to equal the output voltage, wherein the diode-connected transistor is located at a first location on a semiconductor die; and
   using the output voltage to determine a temperature for the first location on the semiconductor die, wherein mirroring the sub-threshold leakage current through the diode-connected transistor further comprises connecting the diode-connected transistor to the output node through a first switch.

7. The method of claim 6, the method further comprising mirroring the sub-threshold leakage current through a second diode-connected transistor located at a second location on the die to produce a second output voltage at a drain of the second diode-connected transistor while maintaining a drain voltage for the sensor transistor to equal the second output voltage.

8. The method of claim 7, further comprising using the second output voltage to determine a temperature for the second location on the die.

9. The method of claim 7, wherein mirroring the sub-threshold leakage current through the second diode-connected transistor further comprises connecting the second diode-connected transistor to the output node through a second switch.

10. A temperature sensor, comprising:
    an NMOS sensor transistor having a source and a gate coupled to ground, wherein the sensor transistor is configured to conduct a leakage current;
    a first NMOS diode-connected transistor having a drain and a gate coupled to an output node for the temperature sensor and having a source coupled to ground;
    a first NMOS transistor having a source coupled to a drain of the NMOS sensor transistor,
    a PMOS diode-connected transistor having a drain coupled to a drain of the first NMOS transistor and having a source coupled to a power supply node;
    a first PMOS transistor having a source coupled to the power supply node and having a gate coupled to a gate for the PMOS diode-connected transistor; and
    a second NMOS diode-connected transistor having a source connected to the output node for the temperature sensor, a gate connected to a gate for the first NMOS transistor, and having a drain coupled to a drain for the first PMOS transistor.

11. The temperature sensor of claim 10, wherein the NMOS sensor transistor is located at a first location on a die, and wherein the first NMOS diode-connected transistor is located at a second location on the die remote from the first location.

* * * * *